US008180562B2

(12) United States Patent
Clark et al.

(10) Patent No.: US 8,180,562 B2
(45) Date of Patent: May 15, 2012

(54) SYSTEM AND METHOD FOR TAXI ROUTE ENTRY PARSING

(75) Inventors: Samuel T. Clark, Federal Way, WA (US); Roglenda R. Bowe, Maple Valley, WA (US); Wayne R. Jones, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 1015 days.

(21) Appl. No.: 12/133,114

(22) Filed: Jun. 4, 2008

(65) Prior Publication Data

US 2009/0306887 A1   Dec. 10, 2009

(51) Int. Cl.
*G01C 21/00* (2006.01)
(52) U.S. Cl. ............... 701/202; 701/7; 701/23; 342/34; 342/76
(58) Field of Classification Search ................ 701/202, 701/7, 23; 342/76, 34
See application file for complete search history.

(56) References Cited

U.S. PATENT DOCUMENTS

| | | | |
|---|---|---|---|
| 3,191,147 A | 6/1965 | Majendie | |
| 3,696,671 A | 10/1972 | Steigleder et al. | |
| 3,706,969 A * | 12/1972 | Paredes | 340/989 |
| 3,825,180 A | 7/1974 | Gallagher | |
| 3,848,833 A | 11/1974 | Rauschelbach | |
| 3,967,098 A | 6/1976 | Harnagel et al. | |
| 4,035,705 A | 7/1977 | Miller | |
| 4,043,526 A | 8/1977 | Donley et al. | |
| 4,147,056 A | 4/1979 | Muller | |
| 4,196,474 A | 4/1980 | Buchanan et al. | |
| 4,212,064 A | 7/1980 | Forsythe et al. | |
| 4,224,569 A | 9/1980 | Campbell | |
| 4,224,669 A | 9/1980 | Brame | |

(Continued)

FOREIGN PATENT DOCUMENTS

DE                3315386 A      10/1984

(Continued)

OTHER PUBLICATIONS

777 Flight Deck (1 page)###http://www.meriweather.com/777/777_main.html [Accessed Jan. 28, 2003]###.

(Continued)

*Primary Examiner* — Luna Champagne
(74) *Attorney, Agent, or Firm* — Perkins Cole LLP (57) ABSTRACT

A method and apparatus for building, creating, or otherwise specifying an airport ground taxi navigation route for an aircraft from an input of the route is disclosed. The apparatus includes a keypad, voice recognition device, or other entry device, a processor, a display screen, and a navigation map database. A crewmember on the aircraft uses the entry device to enter all or part of the ground navigation taxi route. The entry device converts the received route information into an input text string, either with or without delimiters. The system parses the input text string by extracting characters or substrings from the input text string. A database lookup component searches the map database to find a route component that matches the character or substring. If the system finds a matching route component, it determines if the matching route component is continuous with the taxi route. The system adds the matching route component to the taxi route and displays any discontinuity. The system then repeats the process with subsequent substrings of the input text string until the entire input string has been processed. The system may automatically or manually handle input errors or ambiguities.

26 Claims, 9 Drawing Sheets

U.S. PATENT DOCUMENTS

| | | | |
|---|---|---|---|
| 4,247,843 A | 1/1981 | Miller | |
| 4,274,096 A | 6/1981 | Dennison | |
| 4,325,123 A | 4/1982 | Graham | |
| 4,424,038 A | 1/1984 | Tingleff et al. | |
| 4,471,439 A | 9/1984 | Robbins et al. | |
| 4,536,843 A | 8/1985 | Lambregts | |
| H139 H | 10/1986 | Task | |
| 4,631,678 A | 12/1986 | Angermuller et al. | |
| 4,642,775 A | 2/1987 | Cline | |
| 4,729,102 A | 3/1988 | Miller, Jr. et al. | |
| 4,746,981 A | 5/1988 | Nadan et al. | |
| 4,792,906 A | 12/1988 | King et al. | |
| 4,845,495 A | 7/1989 | Bollard et al. | |
| 4,860,007 A | 8/1989 | Konicke et al. | |
| 4,939,661 A | 7/1990 | Barker et al. | |
| 5,050,081 A | 9/1991 | Abbott et al. | |
| 5,053,967 A | 10/1991 | Clavelloux et al. | |
| 5,070,458 A | 12/1991 | Gilmore et al. | |
| 5,072,218 A | 12/1991 | Spero et al. | |
| 5,200,902 A | 4/1993 | Pilley | |
| 5,222,691 A | 6/1993 | Gold et al. | |
| 5,238,203 A | 8/1993 | Skonieczny et al. | |
| 5,243,339 A | 9/1993 | Graham et al. | |
| 5,283,643 A | 2/1994 | Fujimoto | |
| 5,289,185 A | 2/1994 | Ramier et al. | |
| 5,310,135 A | 5/1994 | Fowler et al. | |
| 5,310,136 A | 5/1994 | Fowler et al. | |
| 5,329,277 A | 7/1994 | Dougan et al. | |
| 5,337,982 A | 8/1994 | Sherry | |
| 5,343,395 A | 8/1994 | Watts | |
| 5,416,705 A | 5/1995 | Barnett | |
| 5,420,582 A | 5/1995 | Kubbat et al. | |
| 5,454,074 A | 9/1995 | Hartel et al. | |
| 5,475,594 A | 12/1995 | Oder et al. | |
| 5,499,025 A | 3/1996 | Middleton et al. | |
| 5,508,928 A | 4/1996 | Tran | |
| 5,519,392 A | 5/1996 | Oder et al. | |
| 5,519,618 A | 5/1996 | Kastner et al. | |
| 5,523,949 A | 6/1996 | Agate et al. | |
| 5,592,198 A | 1/1997 | Fagard et al. | |
| 5,593,114 A | 1/1997 | Ruhl | |
| 5,629,691 A | 5/1997 | Jain | |
| 5,668,542 A | 9/1997 | Wright | |
| 5,712,785 A * | 1/1998 | Mok et al. | 701/16 |
| 5,715,163 A | 2/1998 | Bang et al. | |
| 5,736,955 A | 4/1998 | Roif | |
| 5,739,769 A | 4/1998 | Vladimir et al. | |
| 5,745,054 A | 4/1998 | Wilkens | |
| 5,745,866 A | 4/1998 | Steiner | |
| 5,746,392 A | 5/1998 | Gast | |
| 5,790,209 A | 8/1998 | Engelhardt et al. | |
| 5,798,712 A | 8/1998 | Coquin et al. | |
| 5,802,492 A | 9/1998 | DeLorme et al. | |
| 5,803,408 A | 9/1998 | Gast | |
| 5,825,306 A | 10/1998 | Hiyokawa et al. | |
| 5,844,503 A | 12/1998 | Riley et al. | |
| 5,875,998 A | 3/1999 | Gleine et al. | |
| 5,884,219 A | 3/1999 | Curtwright et al. | |
| 5,901,927 A | 5/1999 | Ho | |
| 5,916,297 A | 6/1999 | Griffin, III et al. | |
| 5,920,321 A | 7/1999 | Owen et al. | |
| 5,940,013 A | 8/1999 | Vladimir et al. | |
| 5,941,930 A | 8/1999 | Morimoto et al. | |
| 5,971,318 A | 10/1999 | Lustre | |
| 5,978,715 A | 11/1999 | Briffe et al. | |
| 5,983,158 A | 11/1999 | Suzuki et al. | |
| 5,995,290 A | 11/1999 | Noble | |
| 5,995,901 A | 11/1999 | Owen et al. | |
| 6,005,513 A | 12/1999 | Hardesty | |
| 6,038,498 A | 3/2000 | Briffe et al. | |
| 6,057,786 A | 5/2000 | Briffe | |
| 6,067,502 A | 5/2000 | Hayashida et al. | |
| 6,072,473 A | 6/2000 | Muller et al. | |
| 6,075,467 A | 6/2000 | Ninagawa et al. | |
| 6,085,129 A | 7/2000 | Schardt | |
| 6,098,014 A | 8/2000 | Kranz | |
| 6,112,141 A | 8/2000 | Briffe et al. | |
| 6,118,385 A | 9/2000 | Leard et al. | |
| 6,121,899 A | 9/2000 | Theriault | |
| 6,128,553 A | 10/2000 | Gordon et al. | |
| 6,154,151 A | 11/2000 | McElreath et al. | |
| 6,161,062 A | 12/2000 | Sicre et al. | |
| 6,163,309 A | 12/2000 | Weinert | |
| 6,175,315 B1 | 1/2001 | Millard et al. | |
| 6,181,987 B1 | 1/2001 | Deker et al. | |
| 6,188,937 B1 | 2/2001 | Sherry | |
| 6,199,015 B1 | 3/2001 | Curtwright et al. | |
| 6,246,320 B1 | 6/2001 | Monroe | |
| 6,246,342 B1 | 6/2001 | Vandevoorde et al. | |
| 6,262,720 B1 | 7/2001 | Jeffrey et al. | |
| 6,275,172 B1 | 8/2001 | Curtis et al. | |
| 6,278,913 B1 | 8/2001 | Jiang et al. | |
| 6,289,277 B1 | 9/2001 | Feyereisen et al. | |
| 6,313,759 B1 | 11/2001 | Musland-Sipper | |
| 6,314,343 B1 | 11/2001 | Adams et al. | |
| 6,314,363 B1 | 11/2001 | Pilley et al. | |
| 6,314,366 B1 | 11/2001 | Farmakis et al. | |
| 6,314,370 B1 | 11/2001 | Curtright | |
| 6,328,264 B1 | 12/2001 | Maeda et al. | |
| 6,335,694 B1 | 1/2002 | Beksa et al. | |
| 6,346,892 B1 | 2/2002 | DeMers et al. | |
| 6,362,750 B1 | 3/2002 | Castor et al. | |
| 6,381,519 B1 | 4/2002 | Snyder | |
| 6,381,538 B1 | 4/2002 | Robinson et al. | |
| 6,389,333 B1 | 5/2002 | Hansman | |
| 6,405,975 B1 | 6/2002 | Sankrithi et al. | |
| 6,424,909 B2 | 7/2002 | Kusano et al. | |
| 6,442,394 B1 | 8/2002 | Valentine et al. | |
| 6,443,399 B1 | 9/2002 | Yount et al. | |
| 6,449,556 B1 | 9/2002 | Pauly | |
| 6,453,236 B1 | 9/2002 | Aoki | |
| 6,462,697 B1 | 10/2002 | Klamer et al. | |
| 6,466,235 B1 | 10/2002 | Smith et al. | |
| 6,470,224 B1 | 10/2002 | Drake et al. | |
| 6,473,675 B2 | 10/2002 | Sample | |
| 6,507,739 B1 | 1/2003 | Gross et al. | |
| 6,512,527 B1 | 1/2003 | Barber et al. | |
| 6,522,958 B1 | 2/2003 | Dwyer et al. | |
| 6,542,796 B1 | 4/2003 | Gibbs et al. | |
| 6,545,601 B1 | 4/2003 | Monroe | |
| 6,553,307 B2 | 4/2003 | Stratton et al. | |
| 6,556,902 B2 | 4/2003 | Ing et al. | |
| 6,561,463 B1 | 5/2003 | Yount et al. | |
| 6,571,166 B1 | 5/2003 | Johnson et al. | |
| 6,606,563 B2 | 8/2003 | Corcoran, III | |
| 6,614,397 B2 | 9/2003 | Pullen et al. | |
| 6,614,419 B1 | 9/2003 | May | |
| 6,633,810 B1 | 10/2003 | Qureshi et al. | |
| 6,636,786 B2 | 10/2003 | Partel | |
| 6,668,215 B2 | 12/2003 | Lafon et al. | |
| 6,690,295 B1 | 2/2004 | De Boer | |
| 6,690,299 B1 | 2/2004 | Suiter | |
| 6,693,559 B1 | 2/2004 | Gyde et al. | |
| 6,694,249 B1 | 2/2004 | Anderson et al. | |
| 6,696,980 B1 | 2/2004 | Langner et al. | |
| 6,697,718 B2 | 2/2004 | Le Draoullec et al. | |
| 6,707,387 B2 | 3/2004 | Noguchi et al. | |
| 6,710,723 B2 | 3/2004 | Muller et al. | |
| 6,711,475 B2 | 3/2004 | Murphy | |
| 6,720,891 B2 | 4/2004 | Chen et al. | |
| 6,721,640 B2 | 4/2004 | Glenn et al. | |
| 6,735,505 B2 | 5/2004 | Levine | |
| 6,745,113 B2 | 6/2004 | Griffin, III et al. | |
| 6,751,545 B2 | 6/2004 | Walter | |
| 6,753,891 B1 | 6/2004 | Chohan et al. | |
| 6,759,946 B2 | 7/2004 | Sahinoglu et al. | |
| 6,784,869 B1 | 8/2004 | Clark et al. | |
| 6,789,010 B2 | 9/2004 | Walter | |
| 6,812,858 B2 | 11/2004 | Griffin, III | |
| 6,816,780 B2 | 11/2004 | Naimer et al. | |
| 6,842,672 B1 | 1/2005 | Straub et al. | |
| 6,856,864 B1 | 2/2005 | Gibbs et al. | |
| 6,862,519 B2 | 3/2005 | Walter | |
| 6,870,490 B2 | 3/2005 | Sherry et al. | |
| 6,871,124 B1 | 3/2005 | McElreath | |
| 6,897,790 B2 | 5/2005 | Orton | |
| 6,898,492 B2 | 5/2005 | De Leon | |

| | | |
|---|---|---|
| 6,909,967 B2 | 6/2005 | Hirano et al. |
| 6,915,190 B2 | 7/2005 | Galasso |
| 6,922,631 B1 | 7/2005 | Dwyer et al. |
| 6,927,782 B2 | 8/2005 | Coldefy et al. |
| 6,934,608 B2 | 8/2005 | Qureshi |
| 6,946,976 B1 | 9/2005 | Langner et al. |
| 6,957,130 B1 | 10/2005 | Horvath et al. |
| 6,980,198 B1 | 12/2005 | Gyde et al. |
| 6,992,596 B2 | 1/2006 | Cole et al. |
| 6,992,597 B2 | 1/2006 | Rogers et al. |
| 7,024,287 B2 | 4/2006 | Peckham et al. |
| 7,030,892 B1 | 4/2006 | Gyde et al. |
| 7,039,505 B1 | 5/2006 | Southard et al. |
| 7,039,509 B2 | 5/2006 | Podowski |
| 7,049,953 B2 | 5/2006 | Monroe |
| 7,057,549 B2 | 6/2006 | Block |
| 7,072,746 B1 | 7/2006 | Burch |
| 7,093,070 B2 | 8/2006 | Rowlan |
| 7,103,455 B2 | 9/2006 | Subelet |
| 7,142,131 B2 | 11/2006 | Sikora |
| 7,148,814 B2 | 12/2006 | Sikora et al. |
| 7,148,815 B2 | 12/2006 | Derringer |
| 7,177,731 B2 | 2/2007 | Sandell et al. |
| 7,181,478 B1 | 2/2007 | Korson et al. |
| 7,188,007 B2 | 3/2007 | Boorman |
| 7,203,577 B2 | 4/2007 | Griffin, III et al. |
| 7,222,017 B2 | 5/2007 | Clark et al. |
| 7,230,632 B2 | 6/2007 | Coldefy et al. |
| 7,256,710 B2 | 8/2007 | Griffin, III et al. |
| 7,321,318 B2 | 1/2008 | Crane et al. |
| 7,345,693 B2 | 3/2008 | Coldefy et al. |
| 7,580,235 B2 | 8/2009 | Hamasaki et al. |
| 7,676,303 B2 | 3/2010 | Hanel |
| 7,711,457 B2 | 5/2010 | Caillaud |
| RE41,396 E | 6/2010 | Clark et al. |
| 7,751,948 B2 | 7/2010 | Boorman et al. |
| 7,835,825 B2 | 11/2010 | Coulmeau et al. |
| 7,844,372 B2 | 11/2010 | Chen et al. |
| 7,945,354 B2 | 5/2011 | Boorman et al. |
| 2002/0030609 A1 | 3/2002 | Baumgartner et al. |
| 2002/0033837 A1 | 3/2002 | Munro |
| 2002/0099528 A1 | 7/2002 | Hett |
| 2002/0111740 A1 | 8/2002 | Horvath et al. |
| 2002/0120392 A1 | 8/2002 | Stratton et al. |
| 2003/0009278 A1 | 1/2003 | Mallet et al. |
| 2003/0025719 A1 | 2/2003 | Palmer et al. |
| 2003/0045994 A1 | 3/2003 | Stratton et al. |
| 2003/0050805 A1 | 3/2003 | Gouyet et al. |
| 2003/0132860 A1 | 7/2003 | Feyereisen et al. |
| 2003/0225492 A1 | 12/2003 | Cope et al. |
| 2004/0006412 A1* | 1/2004 | Doose et al. ............... 701/10 |
| 2004/0059474 A1 | 3/2004 | Boorman et al. |
| 2004/0059497 A1 | 3/2004 | Sankrithi |
| 2004/0230352 A1 | 11/2004 | Monroe |
| 2005/0085959 A1 | 4/2005 | Feyereisen |
| 2005/0090969 A1 | 4/2005 | Siok et al. |
| 2005/0178903 A1 | 8/2005 | Boorman et al. |
| 2005/0182528 A1 | 8/2005 | Dwyer et al. |
| 2005/0192717 A1 | 9/2005 | Tafs et al. |
| 2005/0203675 A1 | 9/2005 | Griffin et al. |
| 2005/0222721 A1 | 10/2005 | Chen et al. |
| 2005/0228674 A1 | 10/2005 | Gunn et al. |
| 2005/0231390 A1 | 10/2005 | Crane et al. |
| 2005/0283305 A1 | 12/2005 | Clark et al. |
| 2006/0004496 A1 | 1/2006 | Tucker et al. |
| 2006/0005147 A1 | 1/2006 | Hammack et al. |
| 2007/0179703 A1 | 8/2007 | Soussiel et al. |
| 2008/0039984 A1 | 2/2008 | Bitar et al. |
| 2008/0065275 A1* | 3/2008 | Vizzini ............... 701/2 |
| 2008/0251308 A1 | 10/2008 | Molnar et al. |
| 2008/0312776 A1 | 12/2008 | Sylvester |
| 2009/0062972 A1 | 3/2009 | Boorman et al. |
| 2010/0076627 A1 | 3/2010 | Boorman et al. |
| 2010/0076628 A1 | 3/2010 | Boorman et al. |
| 2010/0262319 A1 | 10/2010 | Gunn et al. |
| 2010/0262358 A1 | 10/2010 | Boorman et al. |
| 2011/0060484 A1 | 3/2011 | Chen et al. |
| 2011/0224848 A1 | 9/2011 | Boorman et al. |

FOREIGN PATENT DOCUMENTS

| | | |
|---|---|---|
| DE | 4140406 | 6/1993 |
| EP | 0 286 120 | 10/1988 |
| EP | 0 370 640 | 5/1990 |
| EP | 0 489 521 | 6/1992 |
| EP | 1273987 | 1/2003 |
| FR | 2817831 | 6/2002 |
| FR | 2848306 | 6/2004 |
| GB | 886136 | 1/1962 |
| GB | 2144248 A | 2/1985 |
| JP | 05338594 | 12/1993 |
| JP | 07113652 A | 5/1995 |
| JP | 2002013935 A | 1/2002 |
| WO | WO-02/24530 | 3/2002 |
| WO | WO-2004/027732 | 4/2004 |

OTHER PUBLICATIONS

Deltasoft, F-15 Cockpit, Aug. 2001, <http://web.archive.org/web/20010803031953/http://deltasoft.fife.wa.us/cockpit.htm> accessed Aug. 14, 2007.

Hutchins, Edwin, "The Integrated Mode Management Interface," Department of Cognitive Science; University of California, San Diego, Sep. 17, 1996.

Lindenfeld, Ron, "What is an FMS?", Flight Management Systems (5 pages); http://www.ultranet.com/~marzgold//FAQ-FMS.html; [Accessed Jun. 3, 2002].

Meriweather's Flight Deck Acronyms & Definitions (4 pages); http://www.meriweather.com/fd/def.html; [Accessed Jun. 3, 2002].

Meriweather's Flight Deck Flight Acronyms & Definitions (4 pages)###http://www.meriweather.com/fd/def.html [Accessed Jun. 3, 2002]###.

NASA, F-18 Cockpit, 1995, <http://www.dfrc.nasa.gov/gallery/Photo/F-18Chase/Medium/EC95-43155-7.jpg>, accessed Aug. 14, 2007.

Painter et al., "Decision Support for the General Aviation Pilot," Systems, Man, and Cybernetics, IEEE International Conference on Computational Cybernetics and Simulation, Orlando, FL, Oct. 12-15, 1997, pp. 88-93.

Peugeot 406 Handbook, Automobiles Peugeot, Paris, France, May 14, 1998 (pp. 30 and 38).

Presentation by Airbus Industries personnel on Jun. 10, 2002 (12 pgs).

Andre, A.D., "Information Requirements for Low-Visibility Taxi Operations: What Pilot Say," Western Aerospace Labs, Inc., NASA Ames Research Center, pp. 484-487.

Batson et al., "Navigating the Airport Surface: Electronic vs. Paper Maps," AIAA/IEEE Digital Avionics Systems Conference,13th DASC, Phoenix, AZ, USA, Oct. 30-Nov. 3, 1998, pp. 515-520.

Hooey et al., "Integrating datalink and cockpit display technologies into current and future taxi operations," Digital Avionics Systems Conferences, V2, 8 pages (2000).

Jones et al., "Airport Surface Movement Technologies Atlanta Demonstration Overview," Proceedings of 17th Digital Avionics Systems Conference, Bellevue, WA, USA Oct. 31-Nov. 7, 1998, pp. F21/1-10.

Jones et al., "Flight Demonstration of Integrated Airport Surface Automation Concepts," Proceedings of the 14th Digital Avionics Systems Conference, Cambridge, MA, USA, Nov. 5-9, 1995, pp. 77-82.

McCann, R.S., et al., "Advanced Navigation Aids in the Flight Deck: Effects on Ground Taxi Performance Under Low Visibility Conditions," Paper Presented at the World Aviation Congress, 1996, Los Angeles, CA.

McCann, R.S., et al., "Enhancing Taxi Performance Under Low Visibility: Are Moving Maps Enough?" Paper Presenting at the Human Factors and Ergonomics Society 41st Annual Meeting, 1997, Santa Monica, CA.

Mejdal et al., "Human Factors Design Guidelines for Multifunction Displays," U.S. Department of Transportation, Oct. 2001, 79 pages.

Theunissen E. et al., "Design and Evaluation of Taxi Navigation Displays," Paper presented at the Proceedings of the 21 Digital Avionics Systems Conference, 2002, Irvine, CA.

Theunissen E. et al., "Development and implementation of an Exocentric ASMGCS display," Digital Avionics Systems Conferences, 2000, vol. 2, pp. 7.D 5-1-5.8, Oct. 7, 2000.

* cited by examiner

SYSTEM AND METHOD FOR TAXI ROUTE ENTRY PARSING

TECHNICAL FIELD

The present disclosure relates generally to computer-based systems used in the ground navigation of aircraft.

BACKGROUND

The Flight Deck Control Display Unit ("CDU") is an interface system that allows a pilot to monitor, input into, and control various other aircraft systems. The CDU is the primary interface for the aircraft's Flight Management System ("FMS"), thereby making the CDU the primary system used to enter and display the navigation route for flight. However, the CDU is currently not used to enter and display the ground navigation route for taxiing of aircraft because the surface traffic movement does not lend itself to predefined or 'stored' taxi routes, Air Traffic Control (ATC) taxi route datalink capability does not currently exist, and the manual entry and display of taxi navigation routes on the CDU currently requires many user inputs and is, therefore, inefficient and workload intensive. Typical ground-based navigation systems used in cars or trucks are inadequate because they are based on origin and destination. These systems allow users to select from multiple routes based on various criteria, such as shortest time or distance. In contrast, taxi navigation is route-based, with every intermediate component of the route specified. The entry of route discontinuities and invalid route components must be avoided. Conventional solutions to this problem have been to develop systems that are completely separate from the CDU. Separate systems are undesirable for several reasons, including because they require the pilot to learn how to use such systems, take up valuable space and add complexity in an already crowded and complex flight deck, and federate aircraft navigation route interface and display into separate locations and methods. It is desirable to provide a common system and method of aircraft navigation route interface and display that utilizes the CDU to integrate taxi and flight routes, is efficient, minimizes workload, and minimizes potential for entry error.

SUMMARY

A method and apparatus for building, creating, or otherwise specifying an airport ground taxi navigation route for an aircraft from an input of the route is disclosed (hereinafter referred to as the "taxi route input parsing system" or "system"). The method can be implemented using standard systems of an aircraft, such as the Flight Deck Control Display Unit ("CDU"). The apparatus includes a keypad, voice recognition device, or other entry device, a display screen, and a navigation map database. A crewmember on the aircraft uses the entry device to enter all or part of the ground navigation taxi route. The entry device converts the received route information into an input text string, either with or without delimiters. The system parses the input text string by extracting characters or substrings from the input text string. A database lookup component searches the map database to find a route component that matches the character or substring. If the lookup finds a partial match, the system concatenates an additional character or substring from the input text string to the first substring and repeats the search. If the system finds a matching route component, it determines if the matching route component is continuous with the taxi route. For the first route component, this may include determining if the matching route component intersects with the aircraft's current or planned starting position, origin/destination gate, or origin/destination runway. If the matching route component is continuous with the preceding taxi route segment, the system adds the matching route component to the taxi route. The system then repeats the process with subsequent substrings of the input text string. For intermediate or last route components, origin or destination gate or runway knowledge may be used to resolve ambiguities or otherwise facilitate correct parsing. The system may display the taxi route as it is generated, display a partial route at an intermediate processing point, or display the full route when processing is complete. If the matching route component is not continuous with the preceding taxi route segment, the system may display or otherwise identify the route discontinuity between the two. If the database lookup does not find a match or partial match, the entry may be identified as invalid. The system may stop further route processing until the invalid entry is resolved (manually or automatically) or may continue processing and resolve the invalid entry later. Similarly, if the database lookup finds multiple matches or partial matches, the system may stop processing until the ambiguity is resolved or may continue processing and resolve the ambiguity later. The system may automatically resolve the ambiguity using information from further input processing or based on continuity with the existing taxi route. The system may also assist the user in manually resolving the ambiguity by showing the ambiguity graphically or alphanumerically.

The features, functions, and advantages that have been discussed can be achieved independently in various embodiments of the present disclosure or may be combined in yet other embodiments further details of which can be seen with reference to the following description and drawings.

DETAILED DESCRIPTION

Various embodiments of the disclosure will now be described. The following description provides specific details for a thorough understanding and an enabling description of these embodiments. One skilled in the art will understand, however, that the disclosure may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the disclosure.

I. Taxi Route Entry

Figure 1:
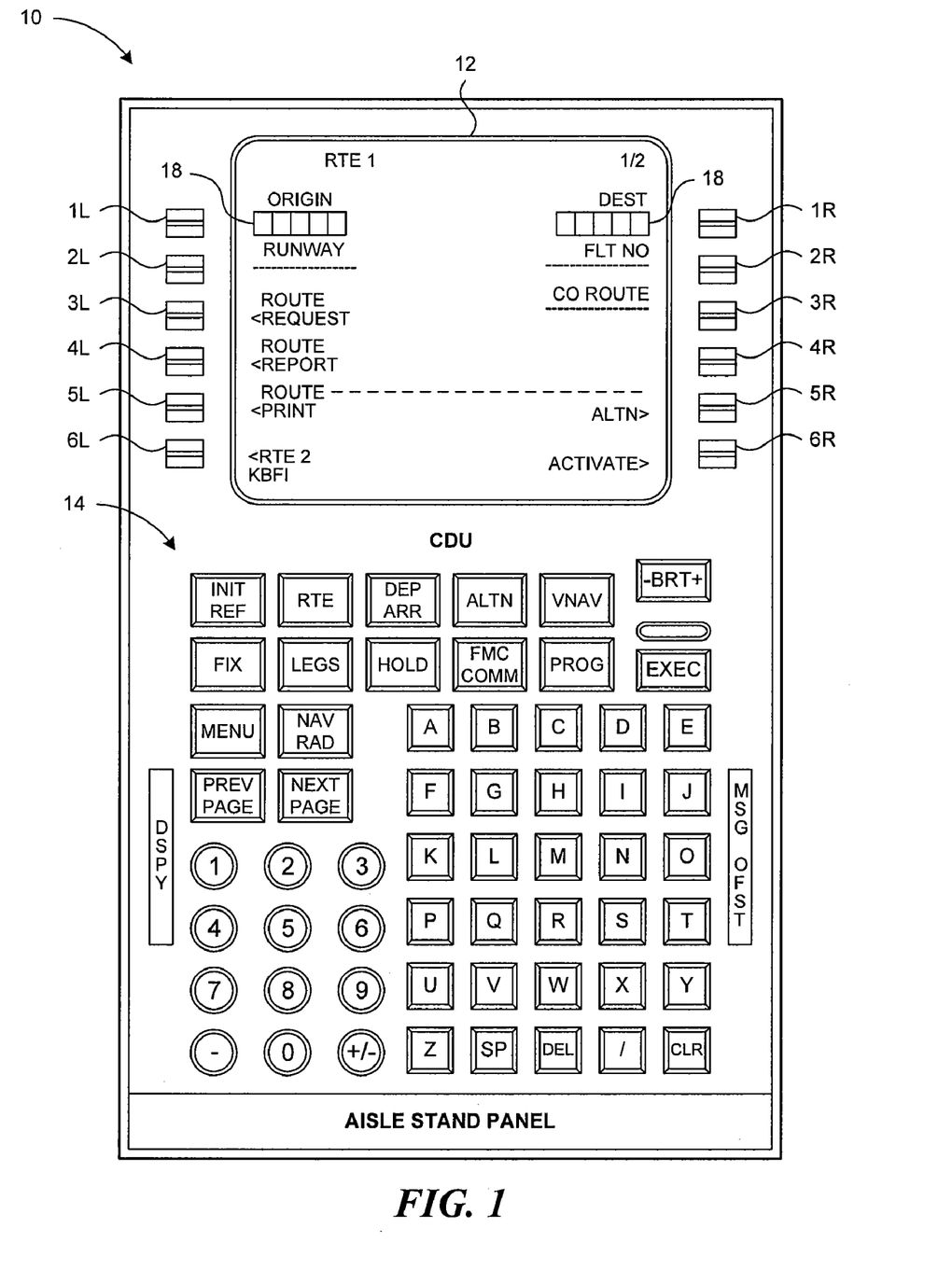
FIG. 1 illustrates a conventional CDU for a commercial aircraft.
Figure 2:
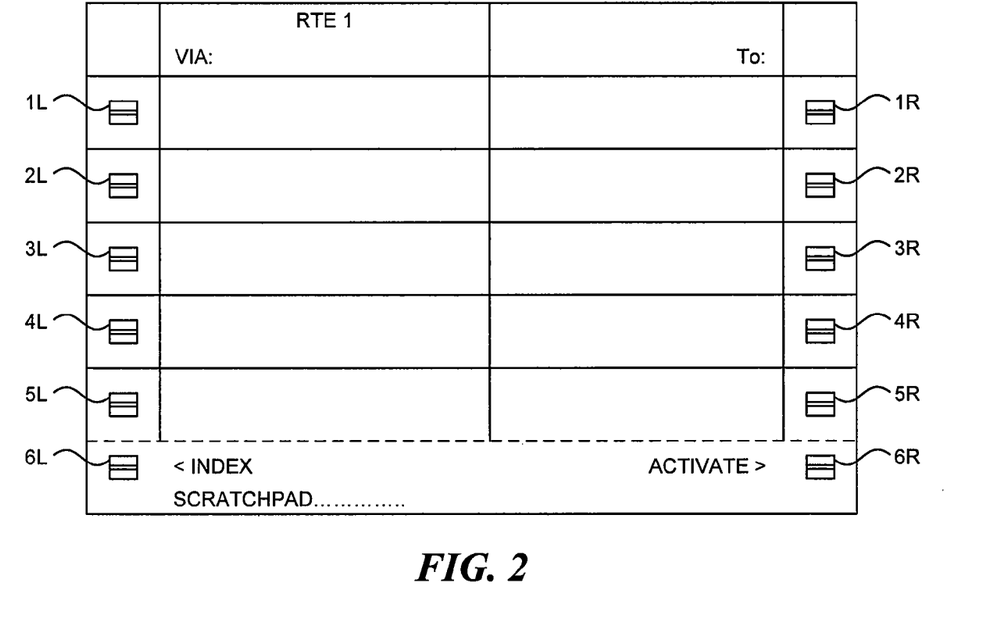
FIG. 2 illustrates a CDU display screen with an entry field, a plurality of display lines, and corresponding display line select keys.

Referring to FIG. 1, a drawing of a conventional CDU 10 for commercial aircraft is shown. The CDU has a display 12 and a keypad 14. Keypad 14 includes CDU page keys, alphanumeric entry keys, and various function keys. Display 12 can have at least one entry field, a plurality of display lines, and a plurality of display line select keys corresponding to display lines. The conventional CDU includes twelve display lines and display line select keys, six on the left and six on the right, and are commonly referred to as 1L through 6L for the display lines and display line select keys on the left side of the CDU display screen and 1R through 6R for the display lines and display line select keys on the right side of the CDU display screen. The entry field for conventional CDU is below display line 6L and is commonly referred to as the SCRATCHPAD. A drawing of display 12 with empty or cleared display lines and entry field, labeled SCRATCHPAD, is shown in FIG. 2. To aid the description of the drawings showing examples of display 12, the display lines corresponding to their respective display line select keys 1L through 6L and 1R through 6R are delineated in table form. For example, referring to FIG. 2, the box to the right of display line select key 1L will be referred to as display line 1L and the box to the left of display line select key 1R will be referred to as display line 1R.

Figure 3A:
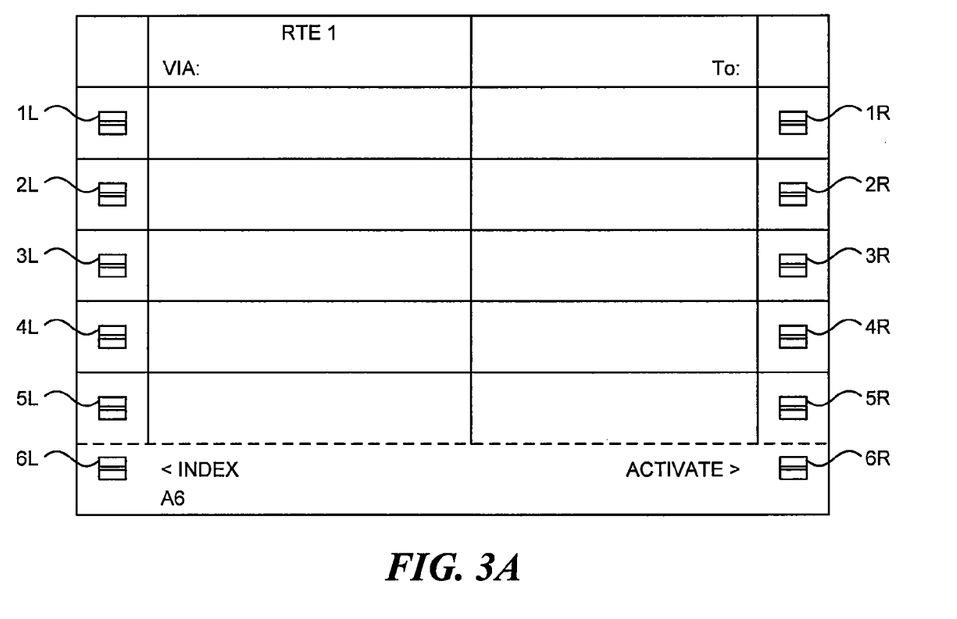
FIGS. 3A through 3D are a series of drawings of CDU display screens that show how a taxi route is entered and displayed on a CDU according to a conventional method.
Figure 3B:
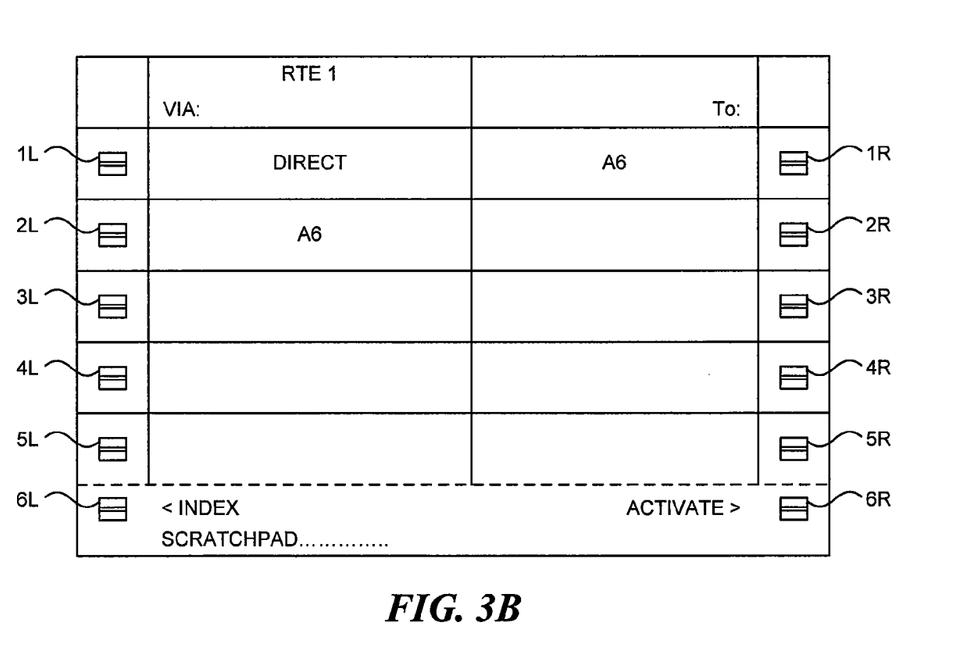
Figure 3C:
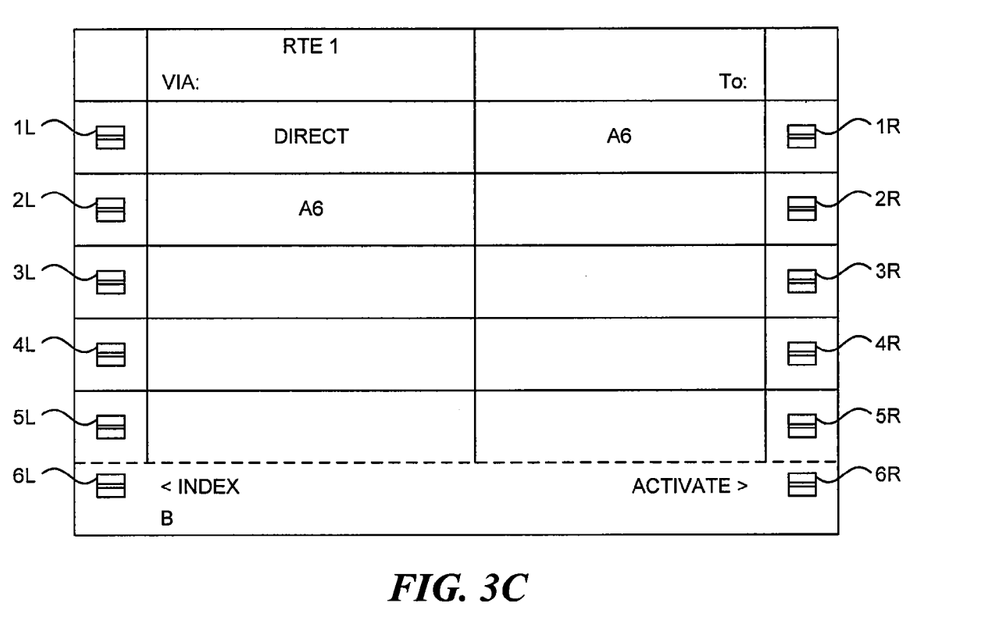
Figure 3D:
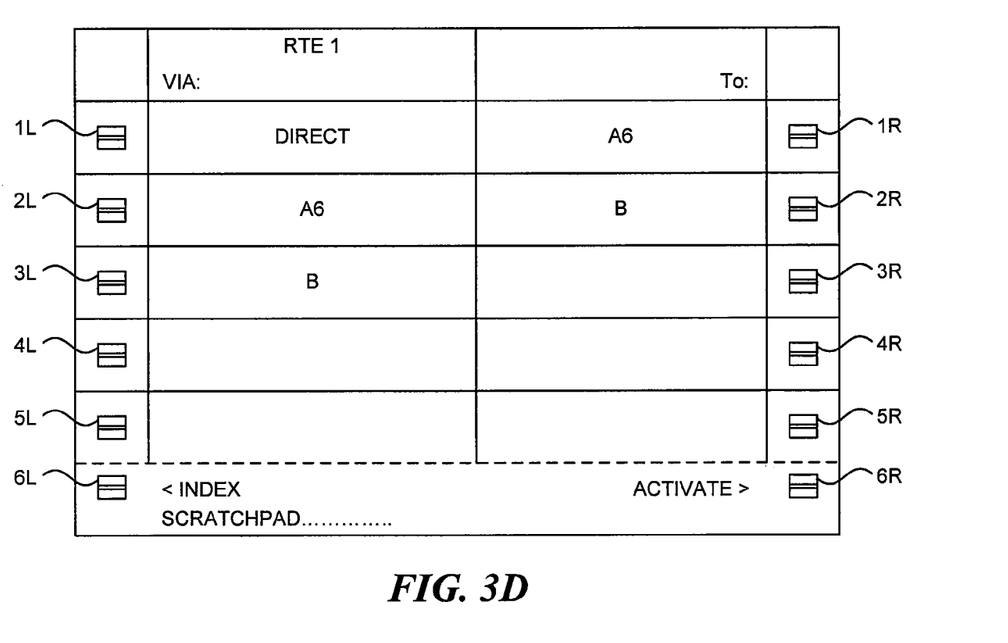

The conventional method of entering and displaying information on the CDU requires multiple inputs by the pilot. Referring to FIG. 3A, the pilot must first enter a first taxi route component into the SCRATCHPAD entry field using the keypad, which in this example is taxi route component A6, and second, press one of the display line select keys in which the first taxi route component is to be displayed. For example, referring to FIG. 3B, if the pilot pressed display line select key 1R, the system would display taxi route component A6 in display line 1R. In addition, the system would display DIRECT, or some other linkage to A6 (or lack of linkage such as a discontinuity), in display line 1L and taxi route component A6 in display line 2L to show that the aircraft must move from its current position, DIRECT, to taxi route component A6 in order to reach component A6 in the taxi route. To continue to enter the taxi route, the pilot must enter a second taxi route component into the SCRATCHPAD entry field using the keypad and press the display line select key in which the second taxi route component is to be displayed. For example, referring to FIG. 3C, if the assigned taxi route is to have taxi route component B follow taxi route component A6, the pilot would enter B into the SCRATCHPAD entry field using the keypad. Then, referring to FIG. 3D, press display line select key 3L to display taxi route component B in display line 3L. In addition, the system would display taxi route component B in display line 2R to show that the aircraft must move via taxi route component A6 to taxi route component B to move along the taxi route. Alternatively, taxi route component B could have been selected into display line 2R and would have also displayed in line 3L. For the conventional method and system, this order of entries must be repeated to enter a series of taxi route components to display a taxi navigation route on the CDU or other display.

A problem with the conventional method is that it requires a significant amount of crewmember time and attention to enter a complete taxi route. In general, flight deck systems are designed to allow the crewmember to focus on primary flight tasks of aviation (controlling the plane's flight), navigation, and communication. Thus, flight deck systems should be designed so that other tasks take as little time as possible. In particular, a ground navigation system should allow the crewmember to enter a taxi route with a minimum amount of time and effort. The system should automate as much of the process as possible while enabling the crewmember to easily verify the final results. The system should also detect mistakes and notify the crewmember to fix them, assist the crewmember in fixing them, or automatically fix them.

Ground navigation systems may be designed to receive a taxi route either through a graphical user interface (GUI), a text-based interface, a voice recognition interface, or various other interfaces. GUI systems are described in U.S. patent application Ser. No. 10/369,187, entitled "AIRPORT TAXIWAY NAVIGATION SYSTEM", and U.S. Pat. No. 7,222,017, entitled "METHOD AND SYSTEM FOR DISPLAYING GROUND TAXI INSTRUCTIONS", which are hereby incorporated by reference. An advantage of a GUI system is that it is relatively intuitive—the crewmember on the aircraft can add a route component (e.g. taxiway, runway, access ramp, or gate) to the taxi route simply by selecting it on the display. However, these systems require a new hardware, software, or training. In contrast, the CDU provides a familiar interface that already exists in most commercial and business aircraft today. However, in the absence of a datalinked or stored route, the current need to line select individual entries is time consuming and labor intensive.

The taxi route input parsing system simplifies route input by allowing the user to input the taxi route as a single text string, with or without delimiters. For example, a taxi route that starts on taxiway A6, continues on taxiway B, taxiway E, taxiway P, and taxiway P1, and ends on runway 14L could be entered as 1) A6BEPP114L (no delimiter), 2) A6.B.E.P.P1.14L (period delimiter), 3) A6/B/E/P/P1/14L (slash delimiter), or 4) A6 B E P P1 14L (space delimiter). If the input includes delimiters, parsing the route is less complex, but entering the route requires an additional keypress for every delimiter and increases the chance of error. However, eliminating delimiters requires more complex parsing and makes the input text string harder for a crewmember to read and verify.

Figure 4:
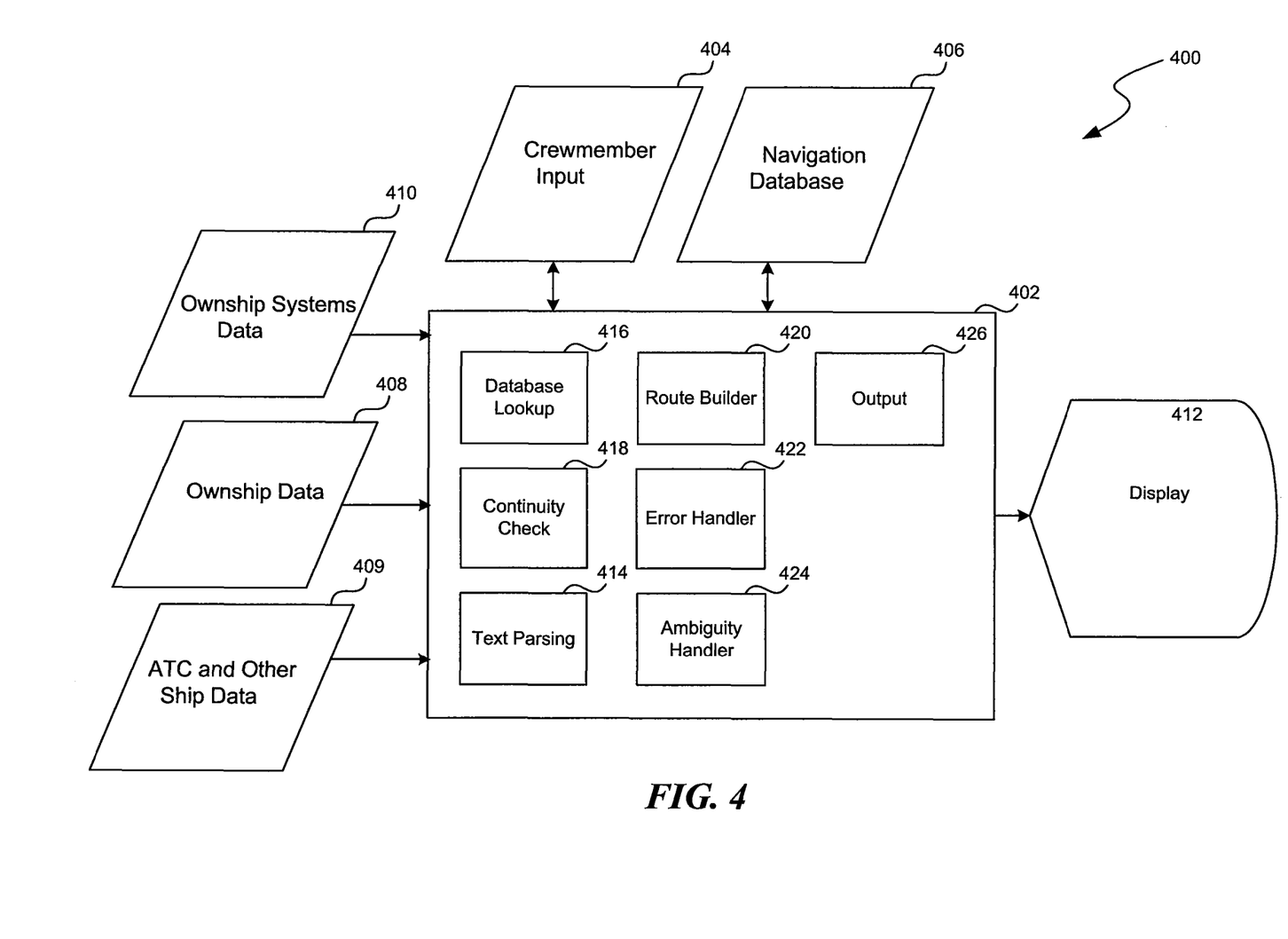
FIG. 4 illustrates a block diagram of a taxi route input parsing system.

FIG. 4 illustrates a block diagram of a taxi route input parsing system 400. Processing in the system is performed by the processing module 402, which handles input, route processing, and output as described below. The processing module 402 is connected to the crewmember input module 404, which provides input data from the crewmember. Input may be received from the CDU keypad 14 or other mechanisms, such as voice commands. In the case of voice commands, the input module 404 may be configured to convert the voice input into text that is provided to the processing module 402. The system 400 also includes a navigation database 406, which stores maps associated navigation data. The navigation database 406 provides navigation, airport, and other maps for in-flight and ground navigation and use. The navigation database 406 includes entries for the gates, ramps, ramp lines, taxiways, runways, and other possible route components. The navigation database 406 generally stores airport maps and route component information for all of the airports where the plane may land. The navigation database 406 is discussed in greater detail below with reference to FIG. 5.

The processing module 402 also receives data from the ownship data module 408. The ownship data module 408 provides information about the aircraft and its movement, such as position, heading, and speed. The ownship data module 408 receives this information from the instruments on the aircraft, such as an integrated Global Positioning System (GPS) receiver. The processing module 402 is also connected to the ownship systems data module 410, which integrates status information from the various flight and other systems on the aircraft. In combination, the ownship data module 408 and the ownship systems data module 410 provide a full picture of what is happening with the aircraft. In addition, the ATC and other ship data module 409 provides external data, including data about the airport itself, airport conditions, ATC clearances, and position, heading, and speed of other traffic or vehicles.

The processing module 402 is connected to the display module 412, which provides information to the pilot and other crewmembers. The display module 412 controls the graphical display, which can display maps and routes (both ground and air). The display module 412 may also show other aircraft/vehicle traffic, runway status, airport data, airport conditions, and ATC clearances. The display module 412 also controls an alphanumeric display, which displays text output. The text output can include status information and navigation text.

As will be described below, the processing module 402 includes a number of modules to execute the taxi route parsing functions of the system. The software code to support the functionality of this system may be stored on a computer-readable medium such as an optical drive, flash memory, or a hard drive. The processing module 402 may have other standard modules that are not shown.

The processing module 402 includes a text parsing module 414, which receives an input text string from the crewmember input module 404 and generates one or more substrings for processing. As noted above, the crewmember input module 404 generates the input text string from input data received from an entry device. For some input devices, such as a voice recognition system, this includes first converting the input data into a text format. The number and length of the substrings varies depending on the input string. For example, if the string is short, the text parsing module 414 may generate a single substring comprising the complete string. If the input text string includes delimiters, the text parsing module 414 separates the substrings according to the delimiters. The processing module 402 also includes a route builder module 420, which constructs the taxi route based on the route components extracted from the input text string. The route builder module 420 uses other modules in the system to build the route. In particular, it interacts with a database lookup module 416, which retrieves data from the navigation database 406, the ownship systems data module 410, and the ownship data module 408. In particular, the database lookup module 416 is configured to determine if a substring received from the text parsing module 414 is a match or a partial match for a route component in the navigation database 406. The route builder module 420 also interacts with a continuity check module 418, which determines whether a continuous route can be built based on two or more map components (e.g. by determining if the map components intersect at any point). The processing component 402 also includes an error handler module 422, which allows the system to handle errors, such as when it detects an invalid input or taxi route discontinuity. Similarly, the processing component 402 also includes an ambiguity handler module 424, which allows the system to automatically or semi-automatically resolve input ambiguities or to facilitate manual resolution of ambiguities. Error and ambiguity handling may include providing a user interface to the user showing the error or ambiguity has automatically been corrected and/or suggesting options to resolve it. Finally, an output module 426 interacts with the display module 412 to display the taxi route, such as by displaying a map from the navigation database with the taxi route highlighted.

II. Map Database

Figure 5:
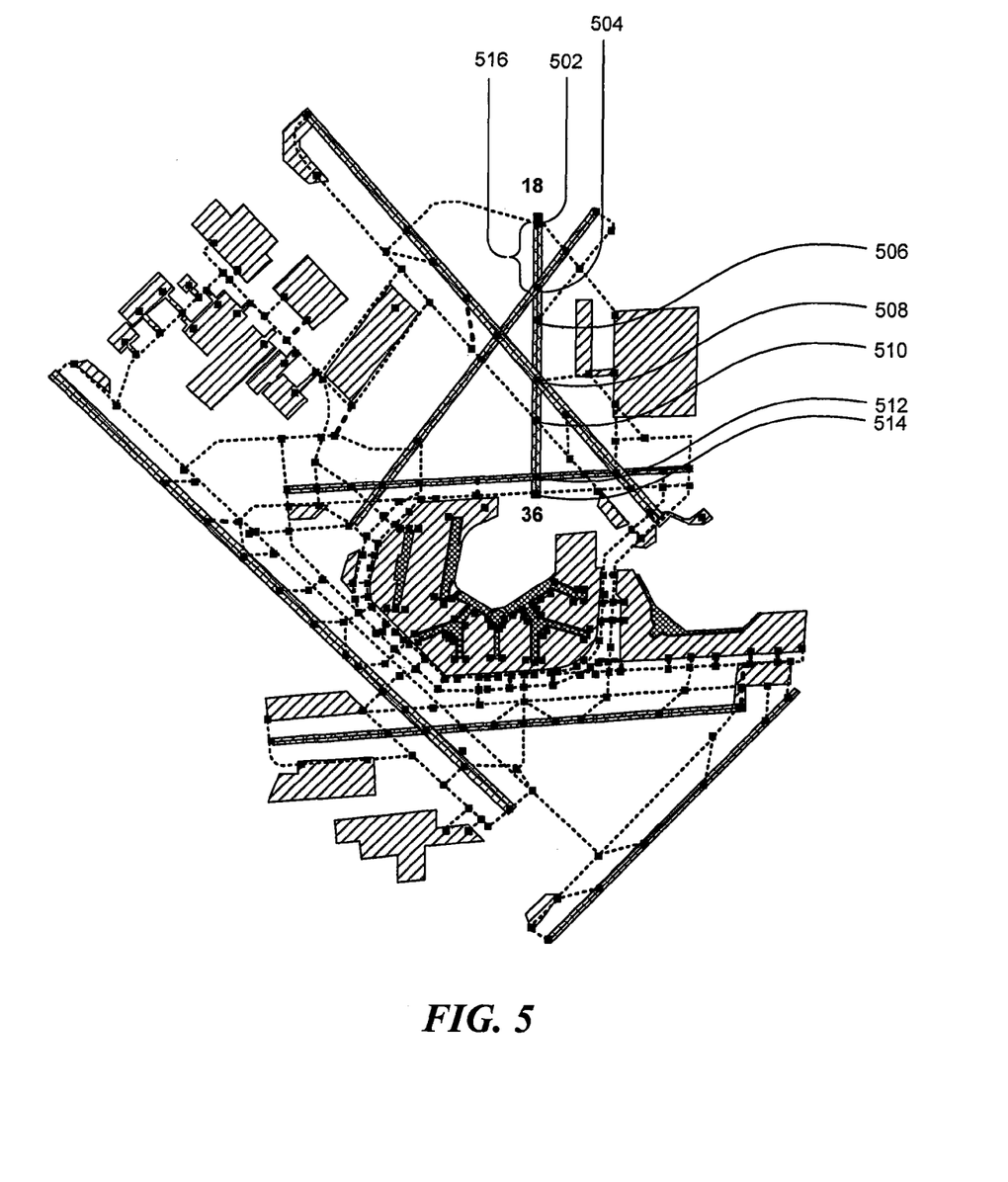
FIG. 5 illustrates a map of Chicago O'Hare International Airport with junction points depicted.

The navigation database 406 includes maps and related data to support taxi route building. The related data includes: 1) a junction list; 2) a segment list; and 3) a route component list.

FIG. 5 shows a map of Chicago's O'Hare International Airport with junction points 502-514 depicted. The junction points are primarily taxiway and runway intersections, but are also located at gates and ramp access points. A junction point is a point where a taxi route can start, can change direction or route component, or end. As discussed below, junction points are the fundamental building block for taxi route building. The junction list includes data for all junction points in the airport. Each entry contains the coordinates of the junction point and a listing of possible taxi route segments connected to or containing that junction point.

Only a subset of junction points, called termination points, can be used as end points of a taxi route. Termination points are generally located at gates, access ramps, or runways. A junction point on a runway, such as junction points 502-514, may be a termination point or an intermediate junction point, depending on whether the plane is taking off from that runway or passing through (respectively). Because aircraft movement is typically not as constrained or controlled in the area around the concourse 518, access ramps are represented as a set of junction points located at points where an airplane leaving a gate could reasonably intercept a taxiway or runway bordering the ramp, or where an arriving aircraft could reasonably intercept the ramp from a bordering taxiway or runway.

A segment is a path between two consecutive junction points, i.e. a path where there are no intermediate branches or junction points. Thus, each segment is an unambiguous path between the two points. Segments may be part of runways or taxiways. For example, runway segment 516 is defined by junction points 502 and 504. A path between any two locations on the map can be unambiguously defined using a set of segments between the two locations. The segment list is a collection of all adjacent pairs of junction points on the airport map. The segment list stores graphical data to provide a graphical representation of the segment on the map. For a straight segment, the segment list simply stores the endpoints (the junction points) of the segment. For curved segments, the graphical data also includes intermediate points needed to draw a curved segment on the map.

The route component list is a collection of the route components in the airport. Route component is a generic term denoting the runways, taxiways, access ramps, and gates used by air traffic control to specify the taxi route. The route component list stores the official name of the component and an ordered list of junctions making up the route component. Because runways are defined in terms of both location and direction, the route component list includes a separate entry for each direction (called reciprocal runways). The entries include an identical set of junction points with reversed order. For example, in FIG. 5 Runway 18 is defined by the list of junction points 502→504→506→508→510→512→514. Runway 18's reciprocal, runway 36, is defined by the ordered list 514→512→510→508→506→504→502.

III. Input Processing

Figure 6:
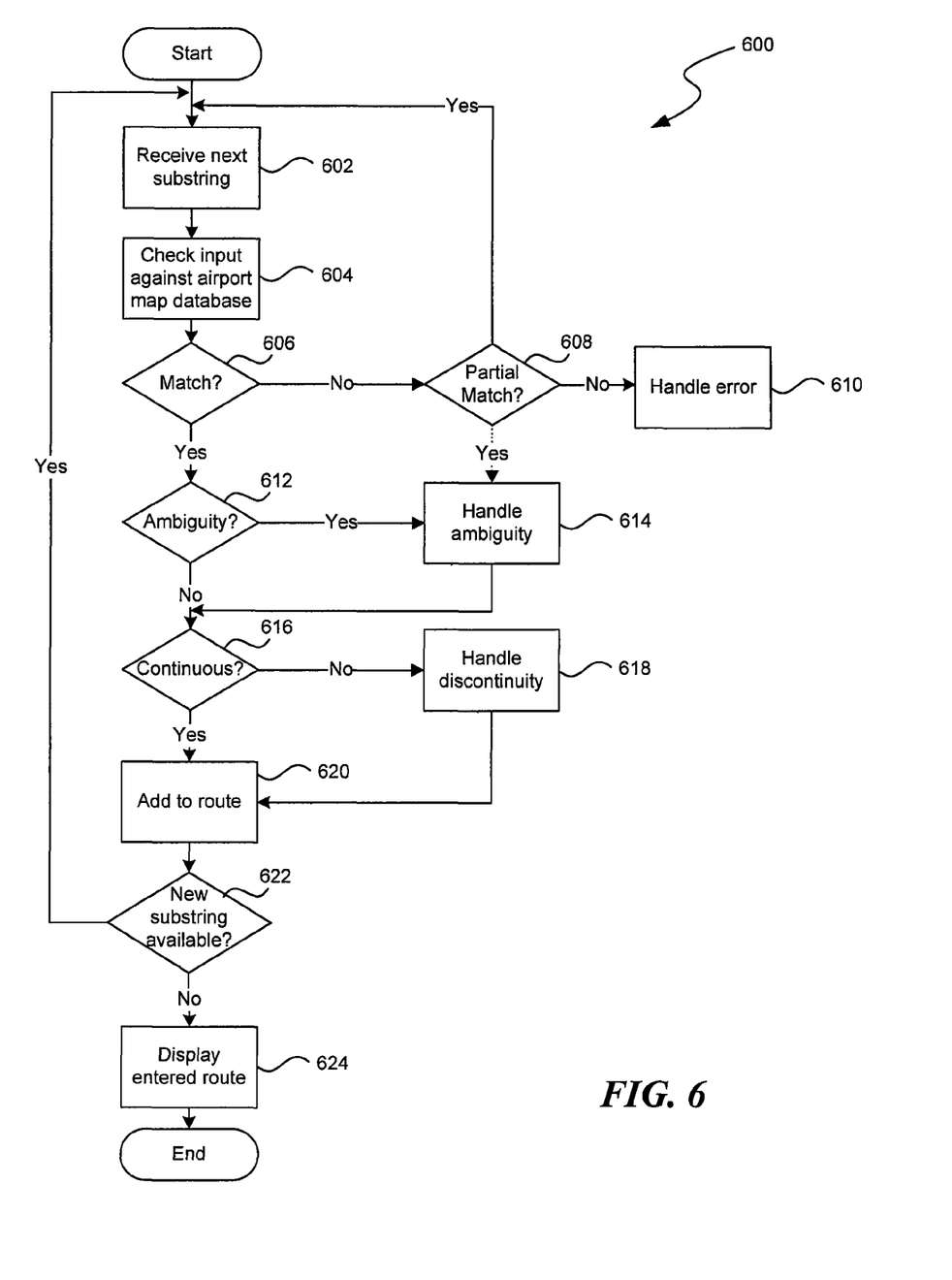
FIG. 6 illustrates a flow chart of a process for constructing or parsing a taxi route from an input text string.

FIG. 6 is a flow chart of a process 600 for constructing a taxi route from an input text string. The process 600 executes as a loop that processes each character or substring in succession until the full input string is processed. The system can be configured to process each character as it is input or to require the user to enter the full route before it starts processing. In either case, the system processes the string one character or substring at a time. The system begins processing in block 602, where it receives the first (or next) character or substring from the input string. After receiving the first input character or substring, the system proceeds to block 604, where the database lookup module 416 (FIG. 4) searches the database to determine if the character or substring is a match or a partial match for a route element in the navigation database 406 (FIG. 4). The database search process is described in greater detail below.

After searching the database, the system proceeds to decision block 606, where it branches depending on whether a match was found. If the lookup did not find a match, the system proceeds to decision block 608, where it branches depending on whether a partial match was found. If there was a partial match, the system may return to block 602 to receive the next character from the input text string. The system may also be configured to treat the partial match as an ambiguity. In that case, the system proceeds along the dotted line from decision block 608 to block 614, which is discussed below. The system may also display partial matches or test for continuity as discussed below. If the lookup also did not find a partial match, the system proceeds to block 610, where it executes error handling for an invalid or unrecognizable entry. Error handling generally includes identifying the error, annunciating to the crewmember that an error has been detected, helping the crewmember correct the error, or automatically correcting the error. This may include highlighting the erroneous text or showing an error message. For example, the system may show the existing CDU scratchpad INVALID ENTRY error message. Error handling may also include generating a sound (e.g. a beep or a message) to notify the crewmember that there has been an invalid input. In one embodiment, the system handles the error by automatically clearing the erroneous input. In another embodiment, the system leaves the text in the display but ignores it for purposes of building the taxi route. The system may require the user to handle an error when it happens or may allow the user to resolve the error after the remainder of the taxi route has been entered. To facilitate error correction, the system may automatically, or on demand, display a list of valid entries or graphically highlight valid entries.

If there was a match, or multiple matches, in decision block 606, the system proceeds to decision block 612, where it determines if there is ambiguity in the match. Ambiguity occurs when the database lookup produces multiple matches for an input text string or if there is a partial match. If there is ambiguity, the system proceeds to block 614, where it handles the ambiguity. The system may handle the ambiguity by using subsequent characters from the input text string to choose the matching route component. It may also handle ambiguity by using aircraft navigation information, continuity with the current route, or crewmember input to select the correct route component.

After handling the ambiguity, the system proceeds to decision block 616, where it determines if the new route component is continuous with the existing route. For the initial component of the taxi route, the system checks continuity by comparing the entered route component to the aircraft's current or planned starting position, origin/destination gate, or origin/destination runway. For example, if the aircraft is landing, the flight navigation system already knows which runway the aircraft will be landing on. The system then checks for continuity by determining whether the matched route component intersects with the landing runway. Similarly, if the aircraft is taking off, the system uses the current location of the aircraft to check for continuity with the initial component. Alternatively, the system may skip this step for the initial route component. For subsequent route components, the system instead checks the new route component for continuity with the previous route component(s).

If the system detects a discontinuity, it proceeds to block 618, where it handles the discontinuity. In some embodiments, the system treats the discontinuity as an error and announces (visually, aurally, etc.) the discontinuity to the crewmember. The crewmember may then be able to fix the error immediately or at a later stage. The system may also use default behaviors to automatically eliminate the discrepancy. For example, the system may automatically assume a direct path from the present position to the initial input. Alternatively, the system may identify and display one or more components or segments that connect the present position to the initial input.

After handling the discontinuity, the system proceeds to block 620, where it adds the new route component to the taxi route. In some embodiments, adding the new route component may require revising the existing route. For example, the new route component may supersede a previously matched component. In that case, adding the new route component includes removing the superseded component from the taxi route. The specifics of route building are discussed below with reference to FIGS. 7A and 7B. During this step, the system builds a data structure that stores the route in progress. The system may display the route in progress on the alphanumeric display and/or on the airport map, for example by highlighting the route on the airport map. The system may also automatically insert a delimiter into the CDU scratchpad text string after the matched substring. This makes it easier for the crewmember to monitor the parsing automation and review and check data entry afterwards.

After adding the new route component, segment, or set of segments to the route, the system proceeds to decision block 622, where it determines if any more characters or substrings are available from the input text string. If more characters are available, the system returns to block 602 to receive the input representing the next route component or segment. The system then repeats the previous steps to build the remaining segments of the taxi route. If there are no more characters, the system is done creating the taxi route. It then proceeds to block 624, where it graphically or alphanumerically displays the entered route. Of course, the system may also display the taxi route as it is generated or display a partial route at an intermediate processing point. For example, the system might be configured to display the updated route in block 620 after adding the new route component to the taxi route. In block 624, the system may also display an interface to enable the crewmember to correct errors or discontinuities from the initial entry process. For example, the interface might display the location of a discontinuity and suggest possible ways to resolve the discontinuity.

IV. Route Building

The route building algorithm is designed to construct a continuous and unambiguous taxi route, while handling input errors and ambiguities. A taxi route is defined as a set of segments connecting two junction points in the airport. The algorithm constructs the taxi route by successively incorporating each matched route component.

As noted above, the system may determine the taxi route starting point using position or navigation information. If it does not determine the starting point, the system simply uses the first route component as a starting point. Effectively, every junction point on the first route component can be considered the starting point.

For each matched route component, the system first determines if the component is continuous with the existing taxi route. It does so by determining if the last component shares a junction point with the previous component input in the taxi route. The system may be configured to test for continuity throughout the entire taxi route or only with the most recently added component. If there is no common junction point, the system handles the discontinuity as discussed above. Of course, for the first entered route component the system may either determine if the component contains the starting point or omit the step entirely.

Figure 7A:
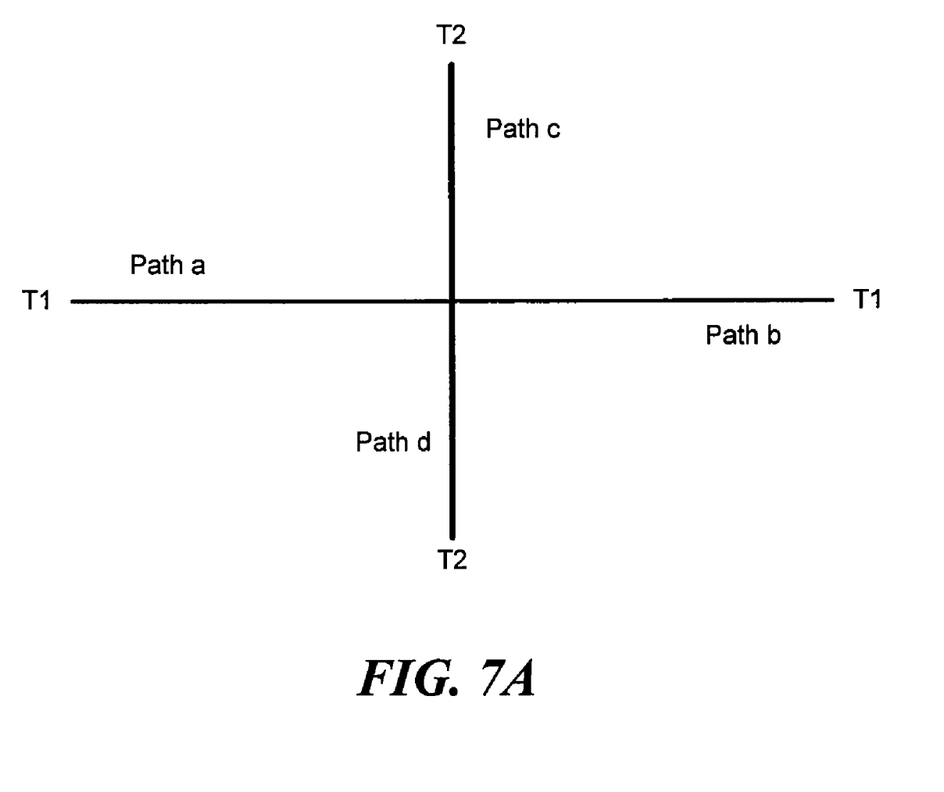
FIGS. 7A and 7B illustrate process steps of building a taxi route by adding route components.
Figure 7B:
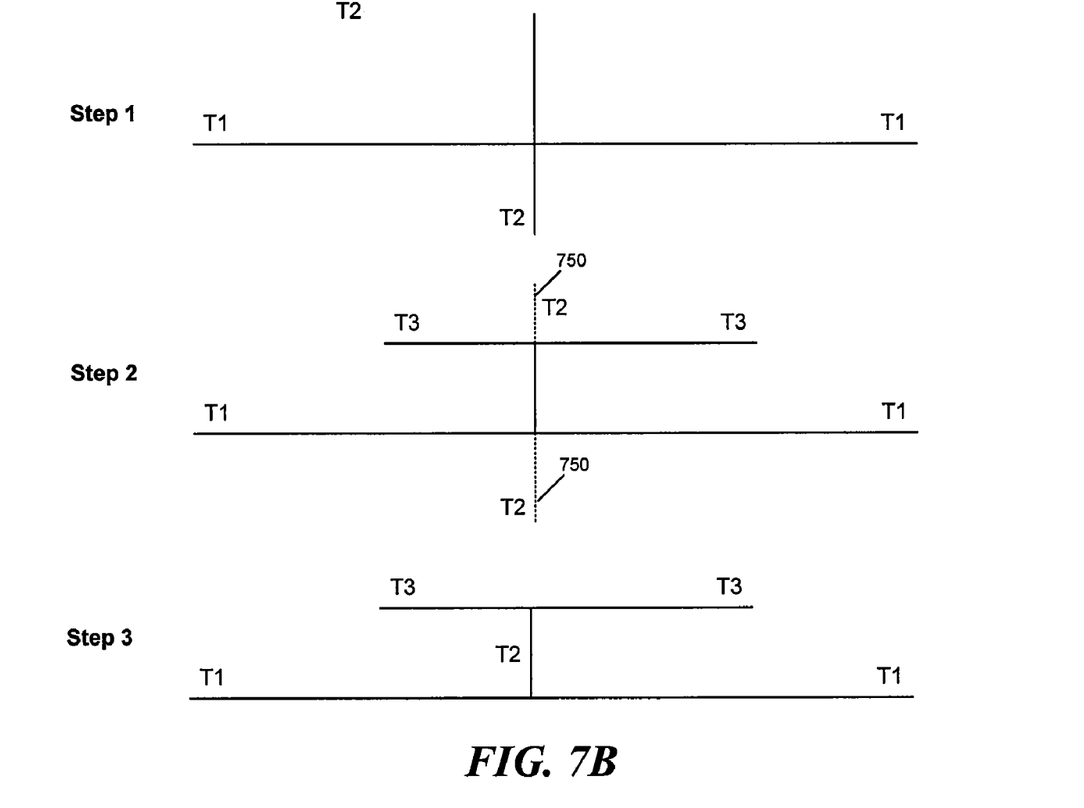

If there is an intersection, the system notes the existence of the connection. However, this leads to the key ambiguity in and principle of route building, termed the "rule of four," which is illustrated in FIGS. 7A and 7B. Junction points in an airport are generally located at three-way or four-way intersections. The rule of four states that given an intersection of two taxiways, as shown in FIG. 7A, there are four possible partial taxi routes for the system to track. If given just T1 and T2 as inputs, the system does not know where on T1 the route starts or where on T2 the route ends. In each case, there are two possibilities, producing four possible routes: 1) T1 path a to T2 path c, 2) T1 path a to T2 path d, 3) T1 path b to T2 path c, and 4) T1 path b to T2 path d. Of course, if the starting point for the route is specified, there will only be one possibility for T1, but the ambiguity remains for component T2. The system thus maintains several possible routes in memory while building the route.

FIG. 7B shows the process of adding successive steps to the taxi route. In Step 1, the system has received the input of taxiway T2 and compared the junction points for T1 and T2 to find the common junction. In Step 2, the system receives the input of taxiway T3. This resolves the ambiguity for T2, because it is now clear that the aircraft will travel on T2 in the direction of T3, and excludes the dashed segments 750. The system then checks the database to find a common junction between T2 and T3. As shown in Step 3, the common junction eliminates ambiguity for T2. However, there are still 4 possible paths, because the system does not know where on T1 the aircraft starts or where on T3 the aircraft ends.

This process continues for each subsequent input until a termination point is reached. As noted above, a gate removes ambiguity because it is a termination point. A runway removes ambiguity because the runway number implies a specific direction of travel on the runway. If the route entry process ends before reaching a termination point, the system may handle the ambiguity by treating it as a discontinuity. Thus, the system may notify the crewmember or provide an interface to resolve the problem.

From the foregoing, it will be appreciated that specific embodiments of the disclosure have been described herein for purposes of illustration, but that various modifications may be made without deviating from the spirit and scope of the disclosure. Accordingly, the disclosure is not limited except as by the appended claims.

We claim:

1. A method performed by a computing system for receiving, determining, and displaying an airport taxi route for a vehicle navigating within an airport, the computing system having a processor and memory, comprising:
    receiving an input text string representing at least a portion of the airport taxi route from a text input component on board the vehicle, the input text string having multiple text characters;
    parsing, by the computing system, a first substring and a second substring from the input text string, the first substring and the second substring each having at least one text character;
    determining, by the computing system, a first matching route component corresponding to the first substring;
    determining, by the computing system, a second matching route component corresponding to the second substring;
    adding the first matching route component and the second matching route component to the airport taxi route; and
    displaying the airport taxi route on a display device on board the vehicle.

2. The method of claim 1, wherein the text input device includes a microphone and wherein receiving an input text string further comprises:
    receiving a voice input representing at least a portion of the airport taxi route from the text input device; and
    generating the input text string from the voice input.

3. The method of claim 1, further comprising:
    determining whether the first matching route component intersects with the airport taxi route,
    wherein the first matching route component and the airport taxi route comprise a plurality of junction points and wherein the first matching route component is determined to intersect the airport taxi route when the matching route component and the airport taxi route have a common junction point.

4. The method of claim 1, further comprising:
    determining whether the first matching route component intersects with the airport taxi route; and
    adding the first matching route component to the airport taxi route when the first matching route component is determined to intersect the airport taxi route.

5. The method of claim 1, further comprising:
    when no matching route component corresponding to the first substring is determined, determining whether a route component partially matches the first substring;
    updating the first substring by concatenating the first substring with a third substring parsed from the input text string; and
    repeating determining a first matching route component corresponding to the first substring.

6. The method of claim 1, further comprising repeating parsing a first substring, determining a first matching route component, and adding the first matching route component until all substrings of the input text string have been processed.

7. The method of claim 1, wherein displaying the airport taxi route comprises displaying an airport map and highlighting the airport taxi route on the airport map.

8. The method of claim 1, wherein the input text string includes a delimiter character.

9. The method of claim 1, further comprising:
    displaying the input text string on an alphanumeric display; and
    automatically inserting at least one of a character, space, or symbol delimiter into the alphanumeric display of the input text string after the first substring when the first matching route component is determined.

10. An apparatus for receiving, determining, and displaying an airport taxi route for an aircraft, comprising:
    a text input entry device;
    a database;
    an input component configured to receive an input text string from the input entry device, the input text string representing at least a portion of the airport taxi route and having multiple text characters;
    a text parsing component configured to parse the input text string to generate a first substring and a second substring from the input text string, the first substring and the second substring each having at least one text character;

a database lookup component configured to find in the database a first matching route component corresponding to the first substring and a second matching route component corresponding to the second substring;

a route builder component configured to add the first matching route component and the second matching route component to the airport taxi route;

a display device; and an output component configured to cause the display device to display the airport taxi route.

11. The apparatus of claim 10, further comprising:

a continuity check component configured to determine whether the first matching route component intersects with the airport taxi route, wherein the first matching route component and the airport taxi route comprise a plurality of junction points and wherein the first matching route component is determined to intersect the airport taxi route when the matching route component and the airport taxi route have a common junction point.

12. The apparatus of claim 10, further comprising:

a continuity check component configured to determine whether the first matching route component intersects with the airport taxi route, wherein the route builder component is configured to add the first matching route component when the matching route component is determined to intersect.

13. The apparatus of claim 10, further comprising:

a continuity check component configured to determine whether the first matching route component intersects with the airport taxi route, wherein the route builder component is configured to add the first matching route component and an indication of discontinuity when the matching route component and the airport taxi route do not intersect.

14. The apparatus of claim 10, wherein the display device is an alphanumeric display and the output component is configured to cause the display device to display a text listing of the airport taxi route.

15. The apparatus of claim 10, wherein the output component is configured to cause the display device to display an airport map and to display the airport taxi route on the airport map.

16. The apparatus of claim 10, wherein the text parsing component is configured to generate a plurality of substrings from the input text string, the database lookup component is configured to find a matching route component corresponding to each of the plurality of substrings, and the route builder component is configured to add each of the matching route components to the airport taxi route.

17. The apparatus of claim 10, further comprising an ownship data component configured to provide position and navigation information about the aircraft, wherein the route builder component is configured to use the position and navigation information to determine a starting point, an intermediate point, or an ending point for the airport taxi route.

18. A computer-readable storage medium containing instructions for controlling a computer system to receive, determine, and display an airport taxi route for a vehicle, by a method comprising:

receiving an input text string representing at least a portion of the airport taxi route from a text input component on board the vehicle, the input text string having multiple text characters;

parsing a first substring and a second substring from the input text string, the first substring and the second substring each having at least one text character;

determining a first matching route component corresponding to the first substring;

determining a second matching route component corresponding to the second substring;

adding the first matching route component and the second matching route component to the airport taxi route; and displaying the airport taxi route on a display device on board the vehicle.

19. The computer-readable storage medium of claim 18, the method further comprising:

determining whether the first matching route component intersects with the airport taxi route, wherein the first matching route component and the airport taxi route comprise a plurality of junction points and wherein the matching route component is determined to intersect the airport taxi route when the first matching route component and the airport taxi route have a common junction point.

20. The computer-readable storage medium of claim 18, the method further comprising:

determining whether the first matching route component intersects with the airport taxi route; and adding the first matching route component when the matching route component is determined to intersect the airport taxi route.

21. The computer-readable storage medium of claim 18, wherein determining a matching route component comprises:

receiving a plurality of matching routes corresponding to the first substring; and selecting the first matching route component from the plurality of matching route components based on a third substring of the input text string, air traffic control data, or crewmember input.

22. The computer-readable storage medium of claim 18, the method further comprising:

when no matching route component corresponding to the first substring is determined, determining whether a route component partially matches the first substring;

updating the first substring by concatenating the first substring with a third substring parsed from the input text string; and repeating determining a first matching route component corresponding to the first substring.

23. The computer-readable storage medium of claim 18, the method further comprising repeating parsing a first substring, determining a matching route component, and adding the matching route component until all substrings of the input text string have been processed.

24. The computer-readable storage medium of claim 18, wherein displaying the airport taxi route comprises displaying an airport map and graphically displaying the airport taxi route on the airport map.

25. The computer-readable storage medium of claim 18, the method further comprising determining at least one of a starting point, an intermediate point, or an ending point for the airport taxi route using aircraft position, navigation information, system information, or ATC clearance information.

26. The computer-readable storage medium of claim 18, the method further comprising notifying a crewmember of an error when a first matching route component is not determined.

* * * * *